Aug. 25, 1931.   T. H. ICHIO   1,820,456
VEHICLE SIGNALING WINDOW
Filed March 27, 1929   2 Sheets-Sheet 1
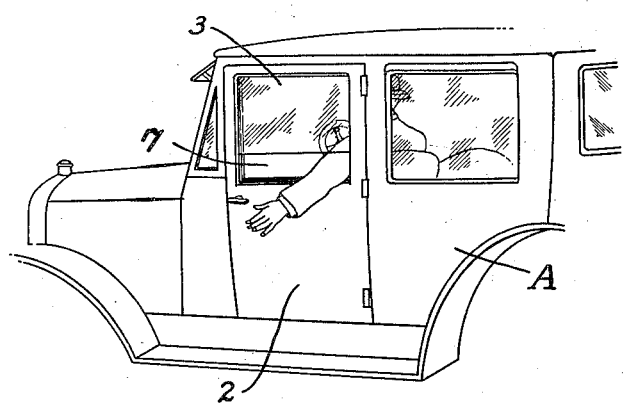
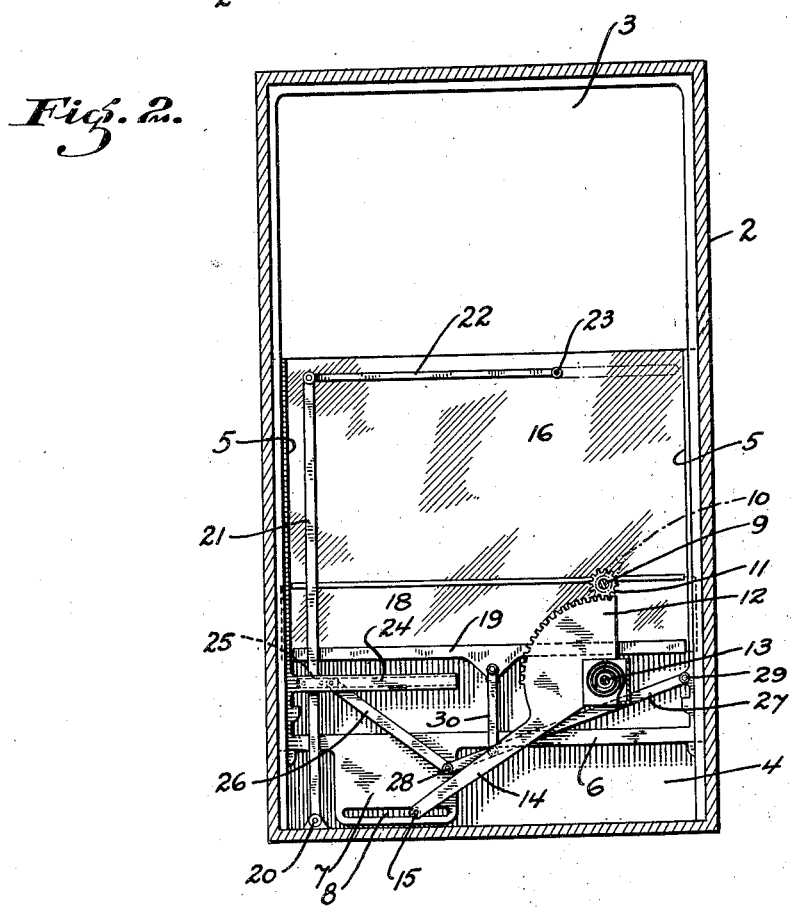
INVENTOR.
Tatsuo H. Ichio.
BY Townsend, Loftus & Abbett
ATTORNEYS.

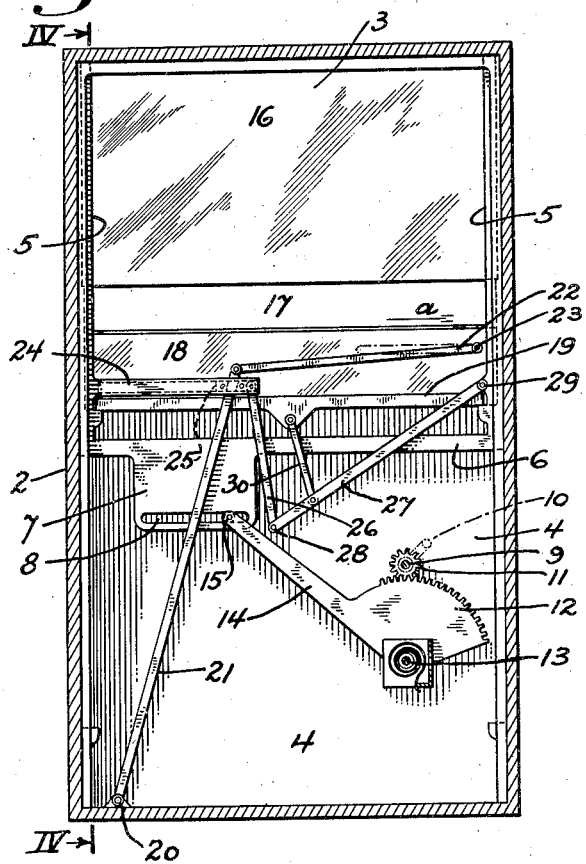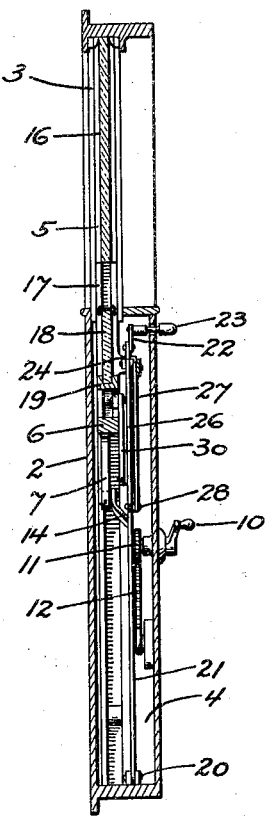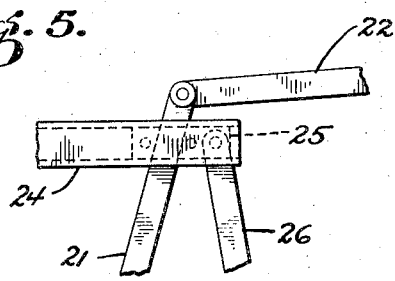

Patented Aug. 25, 1931

1,820,456

UNITED STATES PATENT OFFICE

TATSUO H. ICHIO, OF SAN FRANCISCO, CALIFORNIA

VEHICLE SIGNALING WINDOW

Application filed March 27, 1929. Serial No. 350,183.

This invention relates to motor vehicles of the enclosed type, such as coupes, sedans etc., and especially to a signaling window therefore.

When driving a vehicle such as a sedan or a like closed car, it is often difficult for the driver to project his or her arm when a turn or stop signal is to be given, this being particularly true when rainy or cold weather is encountered, as the window is then usually substantially or fully closed. In fact, a signal cannot be given under such circumstances without lowering the window which takes so much time that the signal is usually given late, or not at all.

The object of the present invention is to provide an auxiliary window, hereinafter to be referred to as a signaling window, which is adapted to be raised and lowered in unison with the usual window, said signaling window being small so that there is just sufficient room to permit the arm to be projected, and said signaling window being furthermore provided with a mechanism whereby it can be almost instantly opened or closed when a signal is to be given.

The invention is shown by way of illustration in the accompanying drawings, in which:

Fig. 1 is a perspective view of a portion of an enclosed type of automobile, showing the application of the invention, Fig. 2 is a sectional view of the front door of an automobile, showing the main and the signaling window in lowered position within the pocket of the door, Fig. 3 is a similar view showing the main window raised, and the signaling window lowered, Fig. 4 is a cross section taken on line IV—IV Fig. 3, Fig. 5 is an enlarged detailed side elevation of the guides 24 and the shoe 25.

Referring to the drawings in detail, particularly Fig. 1, A indicates in general the body of an enclosed type of automobile, 2 indicates the usual form of front door, and 3 the window opening. Doors of this character are ordinarily provided with a sliding window which is adapted to be lowered into a pocket in the door. The invention forming the subject matter of the present application is adapted for installation in a door such as shown in Fig. 1 of the drawings. The invention is best illustrated in Figs. 2, 3 and 4. In these drawings it will be noted that the door is provided with an opening 3, and below the same is formed a pocket 4. Slidably mounted for vertical movement in the pocket and in the window opening 3 is a frame consisting of side members 5, 5 and a bottom member 6. Secured to the bottom member 6 is an extension 7 which is longitudinally slotted, as indicated at 8. Journalled on the inner side of the door is a shaft 9. Secured thereon is a hand crank 10 whereby it may be rotated, and also secured on the shaft 9 is a pinion gear 11. This gear intermeshes with a gear 12 secured on a shaft 13.

Gear 12 is provided with a crank arm 14 and the outer end thereof is provided with a pin 15 which extends into the slotted extension 7.

When gear 11 is rotated by means of the hand crank 10 in one direction, movement will be imparted to the gear 12 and the crank arm 14 to raise the frame consisting of the members 5, 5 and 6. When the hand crank is rotated in the opposite direction the frame will be lowered into the pocket.

Secured between the side members 5, 5 of the frame is a window 16. This, when raised, substantially covers the window opening 3 but it leaves a narrow slot opening, such as shown at 17, see Figs. 1 and 3, this opening being sufficiently large to permit the arm of the driver to be extended when a signal is to be given. The opening 17 may be closed when the window 16 is raised by means of an auxiliary or signaling window, generally indicated at 18. This window is secured in a frame 19, which is slidably mounted between the frame members 5. The signaling window is raised in the following manner:

Pivotally mounted in the bottom of the pocket, as at 20, is an upwardly extending lever 21 which may be locked to assume the vertical position shown in Fig. 2, or the inclined position shown in Fig. 3 by means of a link 22 and a handle 23. This handle extends through a slot formed in the inner surface of the door and by grasping the handle and pushing it away from the driver lever 21 is moved to a vertical position. The upper end of the lever is supported in a guideway 24, and it extends through a shoe 25 slidably mounted therein. A toggle link is connected to the shoe 25, the toggle link consisting of two sections 26 and 27, which are pivotally connected, as shown at 28, the opposite end of the toggle link being secured to one of the frame sections 5, as at 29. An auxiliary link 30 connects link 27 with the frame 19, hence if lever 23 is moved in the direction of arrow $a$, lever 21 is moved to a vertical position, the toggle links 26 and 27 are straightened out and during this straightening movement link 30 is moved upwardly, and as this link is connected with the frame 19 on the signaling window, the signaling window will be raised. Reverse movement of the handle 23 will lower the signaling window. The operation of raising or lowering the signaling window can be accomplished almost instantly as a quick shove in the forward direction raises the window, while a quick pull in the rearward direction instantly lowers the window, thus permitting the arm to be quickly extended whenever a signal is to be given.

The guide member 24 is secured to one of the side frame members 5 hence it will, together with the shoe 25, be raised and lowered whenever the main window frame is raised or lowered, the lowered position being clearly shown in Fig. 2.

While certain features of the present invention are more or less specifically described, I wish it understood that various changes may be resorted to within the scope of the appended claims, similarly, that the materials and finishes of the several parts employed may be such as the manufacturer may decide, or varying conditions or uses may demand.

Having thus described my invention, what I claim and desire to secure by Letters Patent is:

1. In a vehicle door having a window opening formed therein and a pocket below the window opening for the reception of a window, a frame guided in the pocket, a main window and a signaling window carried by the frame, means for imparting vertical movement to the frame to raise and lower the frame, together with the windows, means carried by the frame for raising and lowering the signaling window on the frame and a control mechanism pivotally secured to the door cooperating with and slidably connected to said last named means for opening and closing said signaling window.

2. In a door of the character described having a main window frame slidably mounted therein, a signaling window carried by said main window frame, means carried by the door for operating the main window frame and the signaling window in unison and a second means carried by the main window frame, and operatively connected with the door for operating the signaling window independently of the main window frame.

TATSUO H. ICHIO.